July 9, 1929.  T. H. THOMAS  1,720,251
FLUID PRESSURE BRAKE
Filed Sept. 13, 1927
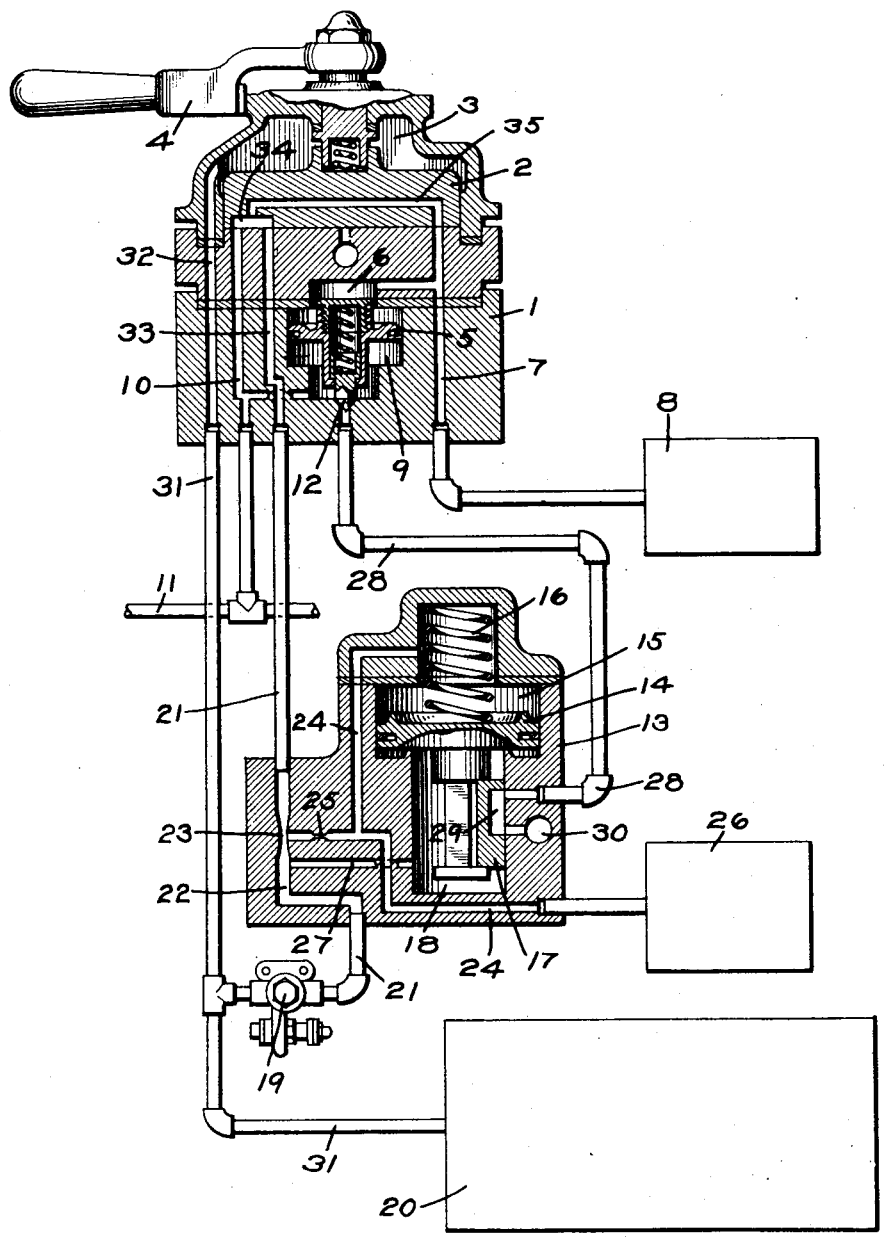
INVENTOR
THOMAS H. THOMAS
BY *Wm. M. Cady*
ATTORNEY Patented July 9, 1929.

1,720,251

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed September 13, 1927. Serial No. 219,201.

This invention relates to fluid pressure brakes, and more particularly to an automatic fluid pressure brake equipment in which the brakes are applied by effecting a reduction in brake pipe pressure.

Leakage of fluid from the brake pipe results in a gradual drop in pressure from the standard pressure at the head end of the train to a lower pressure at the rear and particularly on a long train and where the leakage is excessive the difference in pressure in the brake pipe between the front and the rear of the train may be considerable. Under such conditions, when the engineer's brake valve is moved to effect a service application of the brakes, and the flow of fluid from the feed valve device to the brake pipe is cut off and fluid is vented from the brake pipe at the brake valve, fluid at the higher pressure at the front end of the train reduces by flow to the rear end of the train, where the pressure is lower. At the same time, fluid is vented from the brake pipe at the engineer's brake valve, so that a heavy reduction in brake pipe pressure is produced at the front end of the train which results in the development of a high braking force at the front end of the train, while the brakes are only lightly applied at the rear end. This action is liable to cause the cars at the rear of the train to run into the heavily braked cars at the front of the train and thus cause damaging shocks and possibly the wrecking of the train.

The principal object of my invention is to provide means for obviating the above difficulty.

In the accompanying drawing, the single figure is a diagrammatic sectional view of a fluid pressure brake equipment embodying my invention.

The apparatus shown in the drawing comprises the usual engineer's brake valve device 1, having a rotary valve 2 contained in valve chamber 3 and adapted to be operated by a handle 4 and an equalizing discharge valve mechanism comprising a piston 5 having chamber 6 at one side connected through passage 7 with the usual equalizing reservoir 8, and the chamber 9 at the opposite side connected through passage 10 with the usual brake pipe 11, the piston 5 being adapted to operate a discharge valve 12 for venting fluid under pressure from the brake pipe.

According to my invention a regulating valve device 13 is provided, comprising a piston 14 contained in piston chamber 15 and subject to the pressure of a coil spring 16 and a slide valve 17, contained in valve chamber 18 and adapted to be operated by piston 14.

The usual feed valve device 19 controls the supply of fluid under pressure from the main reservoir 20 through pipe 21 to the brake valve device 1 and communication through said pipe is by way of a passage 22 in the regulating valve device. In said passage is a Venturi tube 23 which is connected to a passage 24 leading to the piston chamber 15, the passage 24 having a restricted or choke passage 25. Connected to passage 24 is a timing reservoir 26 and valve chamber 18 is connected through passage 27 with the feed valve side of passage 22.

The discharge outlet of the discharge valve 12 is connected to a pipe 28 which leads to the seat of slide valve 17 and in the normal position of the slide valve, said pipe is connected through cavity 29 with an atmospheric exhaust port 30. The main reservoir 20 is connected through pipe 31 and passage 32 with the rotary valve chamber 3.

In operation, with the engineer's brake valve 1 in normal running position, as shown in the drawing, fluid under pressure is supplied through the feed valve device 19 to the brake pipe, by way of pipe 21, passage 22, passage 33, cavity 34 in the rotary valve 2, and passage 10. Fluid at feed valve pressure is also supplied through cavity 35 in the rotary valve to passage 7 and the equalizing reservoir 8.

If fluid under pressure is being supplied to the brake pipe, the flow through the Venturi tube 23, by the well known Venturi action, causes a flow of fluid from the piston chamber 15, and the valve chamber 18 being maintained at feed valve pressure by flow through the passage 27, the piston 14 is shifted outwardly against the pressure of the spring 16, moving the slide valve 17, so that communication from pipe 28 to the exhaust port 30 is cut off. The pressure in the timing reservoir 26 is also reduced and this reduction in pressure is proportional to the rate at which fluid flows through the pressure 24 to the Venturi tube 23, which in turn is proportional to the rate at which fluid is supplied through pipe 21 to the brake pipe 11. Thus the greater the leakage of fluid from the brake pipe, the greater the flow of fluid from the feed valve device to the brake pipe, and the greater the flow of fluid from the piston chamber 15 and the timing reservoir 26.

If the engineer moves the brake valve device to service position to effect an application of the brakes, the passage 33 is blanked, so that the flow of fluid from the feed valve device 19 to the brake pipe is cut off and at the same time, fluid is vented from piston chamber 6 and the equalizing reservoir 8. The piston 5 is then operated in the usual manner to open the discharge valve 12, so that fluid under pressure is vented from the brake pipe 11 to the pipe 28. If, however, the piston 14 is in its outer position, due to the reduction in pressure in piston chamber 15 by flow through passage 24 and the Venturi tube 23, then the venting of fluid from the brake pipe to the atmosphere by way of port 30 is cut off.

Fluid under pressure now flows from the feed valve device through passage 22, the Venturi tube 23, and the restricted port 25 to the piston chamber 15 and to the timing reservoir 26. When the pressure in the piston chamber and timing reservoir has been increased to a predetermined degree, the piston 14 will be shifted to its inner position by the spring 16 and then communication will be established from pipe 28, through cavity 29, with the exhaust port 30. Fluid under pressure is then vented from the brake pipe and thereby an application of the brakes is effected in the usual manner.

It will thus be seen that in applying the brakes, a delay period is introduced, before fluid is vented from the brake pipe, which period is proportional to the extent the pressure in the piston chamber 15 and in the timing reservoir 26 has been reduced and which reduction is proportional to the rate of flow of fluid from the feed valve device to the brake pipe and consequently to the rate of leakage from the brake pipe.

If there is substantially no leakage from the brake pipe, the feed valve device remains inactive and the pressure in piston chamber 15 is not reduced. Consequently, the piston 14 remains in its inner position and when the engineer's brake valve is operated to effect a reduction in brake pipe pressure, the venting of fluid from the brake pipe is at once effected, by way of cavity 29 and exhaust port 30.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, of fluid pressure controlled means for controlling communication through which fluid is vented from the brake pipe and operated upon a reduction in fluid pressure for cutting off said communication.

2. In a fluid pressure brake, the combination with a brake pipe, of means for supplying fluid under pressure to the brake pipe, a valve device operated upon a reduction in fluid pressure for cutting off communication through which fluid is vented from the brake pipe, and means operated by the flow of fluid to the brake pipe for controlling the fluid pressure on said valve device.

3. In a fluid pressure brake, the combination with a brake pipe, of means for supplying fluid under pressure to the brake pipe, a valve device for controlling communication through which fluid is vented from the brake pipe and operated upon a reduction in fluid pressure for cutting off said communication, and means subject to the flow of fluid to the brake pipe for controlling the venting of fluid from said valve device.

4. In a fluid pressure brake, the combination with a brake pipe, of fluid pressure controlled means for controlling communication through which fluid is vented from the brake pipe and a Venturi device subject to the flow of fluid to the brake pipe for controlling the fluid pressure on said fluid pressure controlled means.

5. In a fluid pressure brake, the combination with a brake pipe, of fluid pressure controlled means for controlling communication through which fluid is vented from the brake pipe and operated upon a reduction in fluid pressure for cutting off said communication and a Venturi device operated by flow of fluid to the brake pipe for venting fluid from said fluid pressure operated device.

6. In a fluid pressure brake, the combination with a brake pipe, a feed valve device for supplying fluid under pressure to the brake pipe, and means for effecting a reduction in brake pipe pressure, of a valve for controlling communication through which fluid is vented from the brake pipe, a piston operated upon a reduction in fluid pressure for moving said valve to cut off said communication, and a Venturi device operated by the flow of fluid from the feed valve device to the brake pipe, for venting fluid from said piston.

7. In a fluid pressure brake, the combination with a brake pipe, of fluid pressure controlled means for controlling communication through which fluid is vented from the brake pipe and operated upon a reduction in fluid pressure for cutting off said communication, means operated by the flow of fluid to the brake pipe for venting fluid from said fluid pressure controlled means, fluid under pressure being supplied to said fluid pressure controlled means through a restricted port.

8. In a fluid pressure brake, the combination with a brake pipe, of a fluid pressure controlled valve device for controlling communication through which fluid is vented from the brake pipe and operated upon a reduction in fluid pressure for cutting off said communication, means for supplying fluid under pressure to the brake pipe and through a restricted port to said valve device, and means operated by the flow of fluid to the brake pipe for venting fluid from said valve device.

9. In a fluid pressure brake, the combination with a brake pipe, of a timing reservoir, and a valve device subject to the pressure in said reservoir for controlling communication through which fluid is vented from the brake pipe and operated upon a reduction in pressure in said reservoir for cutting off said communication.

10. In a fluid pressure brake, the combination with a brake pipe, of a timing reservoir, a valve device subject to the pressure in said reservoir for controlling communication through which fluid is vented from the brake pipe and operated upon a reduction in pressure in said reservoir for cutting off said communication, means for supplying fluid under pressure to the brake pipe and through a restricted port to said valve device and means operated by the flow of fluid to the brake pipe for venting fluid from said valve device.

In testimony whereof I have hereunto set my hand.

THOMAS H. THOMAS.